(12) United States Patent
Chen et al.

(10) Patent No.: US 10,502,997 B2
(45) Date of Patent: Dec. 10, 2019

(54) TOUCH LIQUID CRYSTAL DISPLAY DEVICE WITH TWO ADHESIVES, TOUCH DISPLAY DEVICE AND LAMINATION METHOD

(71) Applicants: BOE Technology Group Co., Ltd., Beijing (CN); Hefei Xinsheng Optoelectronics Technology Co., Ltd., Anhui (CN)

(72) Inventors: Jun Chen, Beijing (CN); Hongqiang Luo, Beijing (CN); Pengyu Zhang, Beijing (CN); Zhanqi Xu, Beijing (CN); Zhongzheng Yang, Beijing (CN); Kefeng Li, Beijing (CN); Ting Zeng, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 0 days.

(21) Appl. No.: 15/078,721

(22) Filed: Mar. 23, 2016

(65) Prior Publication Data
US 2017/0003536 A1    Jan. 5, 2017

(30) Foreign Application Priority Data
Jul. 2, 2015    (CN) .......................... 2015 1 0391708

(51) Int. Cl.
G02F 1/1333    (2006.01)
(52) U.S. Cl.
CPC .................... *G02F 1/13338* (2013.01); *G02F 2001/133331* (2013.01); *G02F 2001/133354* (2013.01); *G02F 2202/28* (2013.01)

(58) Field of Classification Search
CPC combination set(s) only.
See application file for complete search history.

(56) References Cited

U.S. PATENT DOCUMENTS 6,726,971 B1 *   4/2004   Wong .......................... C09J 7/22
                                                                  428/40.1
2009/0163211 A1   6/2009   Kitazoe et al.
(Continued)

FOREIGN PATENT DOCUMENTS

CN          1567037 A       1/2005
CN        103792714 A       5/2014
(Continued)

OTHER PUBLICATIONS

Aug. 2, 2017—(CN) First Office Action Appn 201510391708.9 with English Tran.

*Primary Examiner* — Lauren Nguyen
(74) *Attorney, Agent, or Firm* — Banner & Witcoff, Ltd.

(57) ABSTRACT

A touch liquid crystal display (LCD) device, a touch display device and a lamination method are provided. The touch LCD device includes an LCD module, a package substrate, a first adhesive and a second adhesive; the LCD module and the package substrate are adhered to each other through the first adhesive which covers a display area of the LCD module; and the second adhesive is disposed between the LCD module and the package substrate and on a non-display area of the LCD module, and hardness of the second adhesive is greater than hardness of the first adhesive. The touch LCD device can effectively eliminate the problem of reduced display quality caused by the water wave phenomenon that the touch LCD device adopting a full lamination method tends to generate.

19 Claims, 2 Drawing Sheets

(56) References Cited

U.S. PATENT DOCUMENTS

| | | | |
|---|---|---|---|
| 2009/0185100 A1* | 7/2009 | Matsuhira | G02B 6/005 |
| | | | 349/58 |
| 2011/0012852 A1* | 1/2011 | Takahashi | G02F 1/13338 |
| | | | 345/173 |
| 2012/0162563 A1* | 6/2012 | Lai | H05K 9/0054 |
| | | | 349/58 |
| 2013/0034713 A1 | 2/2013 | Busman et al. | |
| 2014/0125911 A1* | 5/2014 | Lee | G02F 1/133308 |
| | | | 349/58 |
| 2015/0004382 A1* | 1/2015 | Menon | G06F 3/147 |
| | | | 428/212 |
| 2016/0282653 A1 | 9/2016 | Hu et al. | |

FOREIGN PATENT DOCUMENTS

| | | |
|---|---|---|
| CN | 104317091 A | 1/2015 |
| CN | 104394598 A | 3/2015 |
| CN | 104571654 A | 4/2015 |

* cited by examiner

TOUCH LIQUID CRYSTAL DISPLAY DEVICE WITH TWO ADHESIVES, TOUCH DISPLAY DEVICE AND LAMINATION METHOD

This application claims priority to and the benefit of Chinese Patent Application No. 201510391708.9 filed on Jul. 2, 2015, which application is incorporated herein in its entirety.

TECHNICAL FIELD

At least one embodiment of the present disclosure relates to a touch liquid crystal display (LCD) device, a touch display device and a lamination method.

BACKGROUND

A user can operate a touch display by only touching icons or text on a display screen via a finger, and this makes the human-computer interaction more straightforward. Nowadays, touch displays have been widely applied in the field of display technology.

At present, the touch technology mainly includes one glass solution (OGS), in-cell technology and on-cell technology. An OGS touch display generally includes a touch screen and a display module (e.g., an LCD module). In the in-cell technology and the on-cell technology, a sensor with touch function is embedded into a display module, and the difference only lies in the embedded position: in the in-cell technology, the sensor with touch function is embedded into a pixel unit of the display module; and in the on-cell technology, the sensor with touch function is embedded into an opposite substrate of the display module (the opposite substrate, e.g., a color filter substrate, is opposite to an array substrate of the display module). An in-cell touch display and an on-cell touch display generally include a cover glass and a touch display module (e.g., a touch liquid crystal display (LCD) module).

Full lamination has the advantages of high transmittance, good visual effect, etc., and is widely applied in the field of touch displays. All of the above-mentioned three touch displays can adopt the full lamination method. As for the OGS touch display, full lamination refers to that the touch screen and the display module (e.g., an LCD module) are bonded together by seamless way through glue or an optical adhesive. As for the in-cell touch display and the on-cell touch display, full lamination refers to that the cover glass and the touch display module (e.g., a touch LCD module) are bonded together by seamless way through glue or an optical adhesive.

But the touch display adopting the full lamination method is prone to generate a water wave phenomenon, and the display quality can be reduced. Taking an OGS touch display adopting the full lamination as an example, when the OGS touch display is applied by an external force, for example, when the display screen is pressed by a finger or shook, the display screen is prone to generate the phenomenon similar to ripples on the water, namely the water wave phenomenon, at a position applied by the external force. The main reason for this phenomenon is that: liquid crystal molecules in the LCD module are applied by the external force, thus the deflection of the liquid crystal molecules is inconsistent, and hence abnormal display can be caused.

SUMMARY

At least one embodiment of the present disclosure provides a touch LCD device, a touch display device and a lamination method, to effectively eliminate the problem of reduced display quality caused by the water wave phenomenon that the touch LCD device adopting the full lamination method tends to generate.

At least one embodiment of the present disclosure provides a touch liquid crystal display (LCD) device, which includes an LCD module, a package substrate, a first adhesive and a second adhesive; the LCD module and the package substrate are adhered to each other through the first adhesive which covers a display area of the LCD module; and the second adhesive is disposed between the LCD module and the package substrate and on a non-display area of the LCD module, and hardness of the second adhesive is greater than hardness of the first adhesive.

At least one embodiment of the present disclosure further provides a touch display device, including: a display panel including a first substrate and a second substrate which are arranged to be opposite to each other; a package substrate disposed on a side, away from the second substrate, of the first substrate; a first adhesive connecting the package substrate and the display panel and covering a display area of the display panel; and a second adhesive disposed between the display panel and the package substrate and on a non-display area of the display panel. In the touch display device, hardness of the second adhesive is greater than hardness of the first adhesive.

At least one embodiment of the present disclosure further provides a lamination method, including: forming a first adhesive on a display area of a display panel, with the first adhesive layer covering the display area; and forming a second adhesive on a non-display area of the display panel with hardness of the second adhesive greater than hardness of the first adhesive. In the method, the first adhesive connects the display panel and a package substrate, the second adhesive is disposed between the display panel and the package substrate, the display panel comprises a first substrate and a second substrate which are arranged to be opposite to each other, and the package substrate is disposed on a side, away from the second substrate, of the first substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS OF THE ACCOMPANYING DRAWINGS

1—LCD module; 2—package substrate; 3—first adhesive; 4—second adhesive; 11—display area 12—non—display area; 121—long—side region; 122—short—side region; 13—rear housing; 130—backplane; 131—frame body; 14—opposite substrate; 15—array substrate; 16—liquid crystal; 17—frame sealant; 18—gap; 19—filler; 20—backlight module; 21—support; 22—glue.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "include," "including," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
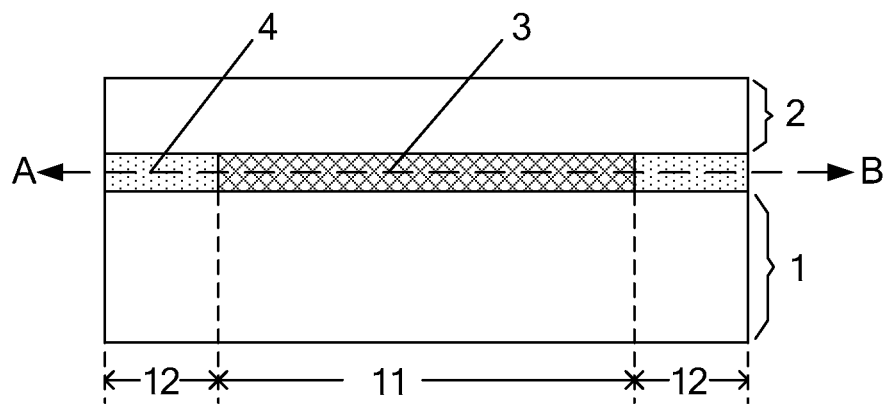
FIG. 1 is a schematic structural view of a touch LCD device provided by an embodiment of the present disclosure.

At least one embodiment of the present disclosure provides a touch liquid crystal display (LCD) device. As illustrated in FIG. 1, the touch LCD device includes an LCD module 1, a package substrate 2, a first adhesive 3 and a second adhesive 4. The LCD module 1 and the package substrate 2 are adhered to each other through the first adhesive 3 which covers a display area 11 of the LCD module 1; the second adhesive 4 is disposed between the LCD module 1 and the package substrate 2 and on a non-display area 12 of the LCD module 1; and the hardness of the second adhesive 4 is greater than hardness of the first adhesive 3.

It should be noted that the type of the touch LCD device is not limited in the embodiment of the present disclosure. For example, the touch LCD device may be an OGS touch LCD device, namely a component with touch function such as a touch sensor may be disposed on the package substrate, so that the package substrate has the touch function. The touch LCD device may also be an in-cell touch LCD device, namely a sensor with touch function is embedded into a pixel unit of the LCD module, so that the LCD module has the touch function. Of course, the touch LCD device may also be an on-cell touch LCD device, namely a sensor with touch function is embedded into an opposite substrate (e.g., a color filter substrate) of the LCD module, so that the LCD module has the touch function. Specific limitations are not imposed thereto. The case can be defined according to actual situation. In a case that the first/second adhesive needs to be solidified, the hardness of the first/second adhesive refers to the hardness after the adhesive is solidified; and the hardness of the first adhesive and the hardness of the second adhesive are obtained according to a same measuring standard.

In addition, the materials of the first adhesive and the second adhesive are not limited in the embodiment of the present disclosure, as long as the following conditions are satisfied: the second adhesive can have a support function; the hardness of the second adhesive is greater than the hardness of the first adhesive; and the touch LCD device can adopt the full lamination method. For example, because glue or an optical adhesive has the characteristics of high transmittance, not easy to bubble and the like, the glue or the optical adhesive may be taken as the first adhesive, and a plastic tape may be taken as the second adhesive to play a supporting role.

In the touch LCD device, the specific position of the second adhesive is not limited in the embodiment of the present disclosure. For example, the second adhesive may cover all the non-display area, and of course, may also cover a part of the non-display area, and of course, may also be other cases. Limitations are not imposed thereto, as long as the second adhesive is disposed on the non-display area and can give support.

Moreover, it should be noted that the display area of the LCD module refers to an area used for display and the non-display area refers to an area except the display area. Besides, the embodiment of the present disclosure does not limit the specific structure of the LCD module and only gives a detailed description on structures relevant to the inventive points in the LCD module. It should be known by those skilled in the art according to the current technology and the common general knowledge that the LCD module may include an array substrate and an opposite substrate (e.g., a color filter substrate) which are assembled together to form a cell, and include liquid crystals, a spacer, a frame sealant and so on, which are disposed between the array substrate and the opposite substrate. For instance, the LCD module may be an LCD panel. Or the LCD module may also include an LCD panel and a backlight module. Of course, the LCD module provided by the embodiment of the present disclosure includes, but not limited to, these implementations.

When the touch LCD device is applied by an external force, because the hardness of the second adhesive between the LCD module and the package substrate is greater than hardness of the first adhesive, compared with the first adhesive, the second adhesive can have a good supporting function so as to cancel out a large part of the external force. In this case, the stress produced by the touch LCD device can be greatly reduced, and hence the stress on the liquid crystals can be reduced. Therefore, the problem of reduced display quality caused by the have water wave phenomenon that the touch LCD device adopting the lamination method tends to generate can be effectively avoided.

Figure 2:
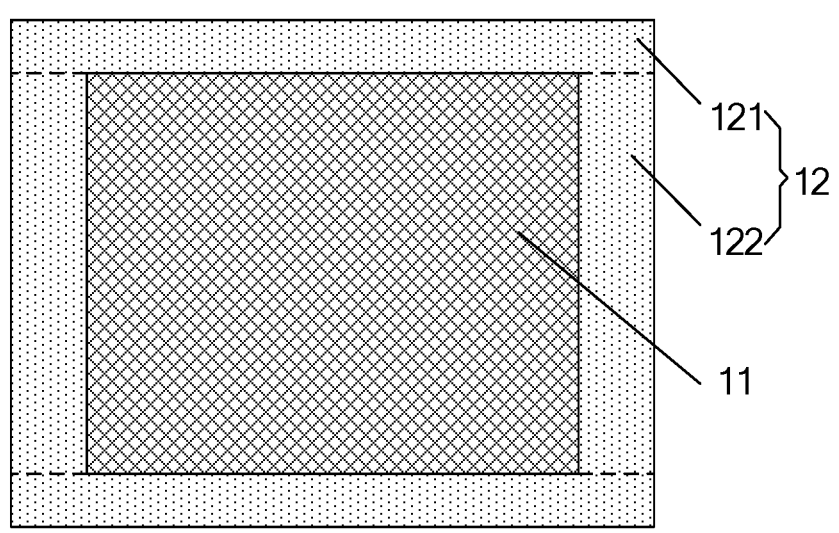
FIG. 2 is a sectional view along an AB direction in FIG. 1.

For instance, the second adhesive covers at least two opposite edge regions in the non-display area. It should be noted here that: because the touch LCD device generally has a cuboid structure, as illustrated in FIG. 2, the non-display area 12 may include two opposite long-side regions 121 and two opposite short-side regions 122, and the second adhesive covering at least the two opposite edge regions in the non-display area refers to that the second adhesive at least covers two opposite long-side regions in the non-display area, or the second adhesive at least covers two opposite short-side regions in the non-display area. Limitations are not imposed thereto. Of course, the touch LCD device may also be in other shape. No limitation will be given in the embodiment of the present disclosure. Description is given in the embodiments of the present disclosure and the accompanying drawings by taking the case that the touch LCD device has a cuboid structure as an example.

Moreover, it should be noted that the number of the edge regions of the non-display area covered by the second adhesive is not limited in the embodiments of the present disclosure. For example, the second adhesive may only cover two opposite short-side regions in the non-display area, or the second adhesive may only cover two opposite long-side regions in the non-display area. The second adhesive may also cover three edge regions in the non-display area. For instance, the second adhesive may cover two opposite short-side regions and one long-side region in the non-display area, or the second adhesive may cover two opposite long-side regions and one short-side region in the non-display area. Of course, the second adhesive may also cover all the non-display area.

In at least one embodiment, the second adhesive may only cover two opposite edge regions in the non-display area. For instance, the second adhesive may only cover two opposite short-side regions in the non-display area, or the second adhesive may only cover two opposite long-side regions in the non-display area, so that a support function can be given and also the cost can be reduced.

Figure 3:
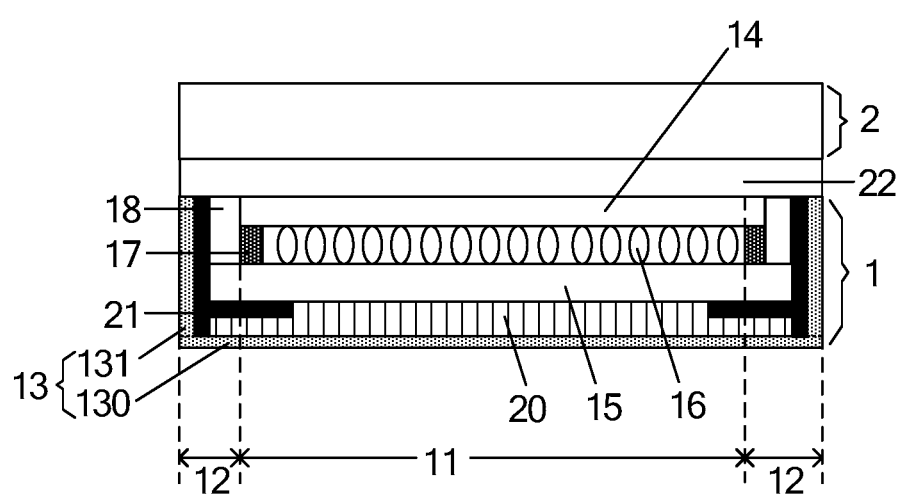
FIG. 3 is a schematic structural view of a touch LCD device known by the inventors.

A touch LCD device known by the inventors is provided. As illustrated in FIG. 3, the LCD module 1 may include a rear housing 13; the rear housing 13 includes a backplane 130 and a frame body 131 connected to a front face of the backplane 130 (namely an upper surface, close to the package substrate 2, of the backplane 130); an accommodating portion is formed by the frame body 131 and the front face of the backplane 130 and provided therein with an opposite substrate (e.g., a color filter substrate) 14 close to the package substrate 2 and an array substrate 15 away from the package substrate 2; liquid crystals 16 and a frame sealant 17 are disposed between the opposite substrate 14 and the array substrate 15; a backlight module 20 is disposed between the array substrate 15 and the backplane 130; and a support 21 is disposed between the backlight module 20 and the frame body 131. The LCD module 1 and the package substrate 2 are adhered to each other through glue 22. An area within the frame sealant 17 in the LCD module 1 is the display area 11, and an area outside the frame sealant 17 is the non-display area 12. It should be noted that the opposite substrate 14 may also be a transparent substrate or other substrate not provided with a color filter layer. Limitations are not imposed in the embodiment of the present disclosure.

In the LCD module, an integrated circuit and the like can be bonded on the array substrate 15, so at least one side of the array substrate 15 protrudes out of the opposite substrate (e.g., the color filter substrate) 14. As illustrated in FIG. 3, a gap 18 can be formed at a position, beyond the opposite substrate, of the array substrate 15. In this case, if the second adhesive is directly disposed at this position, the supporting force of the second adhesive that the gap 18 corresponds to may be small.

Figure 4:
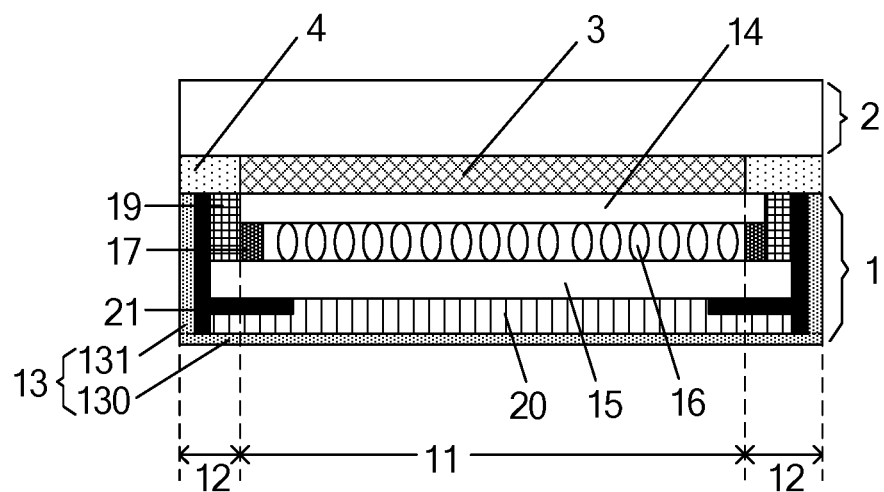
FIG. 4 is a schematic structural view of another touch LCD device provided by an embodiment of the present disclosure.

In order to solve the problem, as illustrated in FIG. 4, the LCD module 1 includes an opposite substrate (e.g., a color filter substrate) 14 close to the package substrate 2 and an array substrate 15 away from the package substrate 2; in edge regions, covered by the second adhesive 4, of the non-display area 12, a filler 19 is disposed at the position, protruding out of the opposite substrate 14, of the array substrate 15; and the second adhesive 4 is disposed on the filler 19 (namely the second adhesive 4 is disposed on a side, close to the package substrate 2, of the filler 19). In this case, the gap 18 as shown in FIG. 3 may be filled with the filler 19. As illustrated in FIG. 4, the second adhesive 4 disposed on the filler 19 has a strong supporting force.

For instance, the filler may be a photosensitive adhesive or a plastic, and the plastics can be poly-terephthalic-acid series, polycarbonate or polythene so as to provide a better supporting force.

For instance, in order to reduce changes to existing processes and reduce the cost, the first adhesive may be glue or an optical adhesive and the second adhesive may be a plastic tape.

For instance, the width of the plastic tape (namely the dimension of the plastic tape in the direction from the non-display area to the display area) may range from 0.2 mm to 0.4 mm, and this can avoid the problem that the plastic tape cannot give support due to too small width and the corner adhesion after bonding is insufficient due to too large width.

For instance, the thickness of the plastic tape (namely the dimension of the plastic tape in the direction from the LCD module to the package substrate) may range from 0.1 mm to 0.5 mm, so that the problem that large-scale bubbles are formed because the glue cannot be pressed at positions adjacent to the plastic tape due to too large thickness of the plastic tape and the supporting effect cannot be achieved due to too small thickness can be avoided.

For instance, in order to increase the adhesion on edges of the LCD module and the package substrate, the plastic tape may be a double-sided plastic tape.

For instance, as illustrated in FIG. 4, in the direction from the LCD module 1 to the package substrate 2, the thickness of the first adhesive 3 may be equal to the thickness of the second adhesive 4. In this case, the second adhesive 4 can have a good supporting effect.

Figure 5:
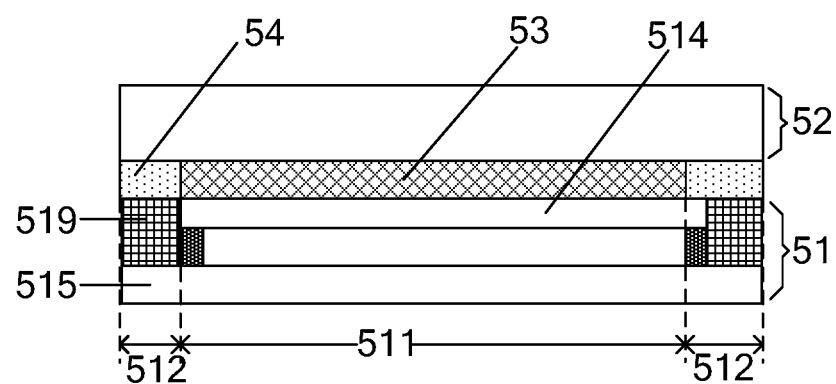
FIG. 5 is a schematic structural view of a touch display device provided by an embodiment of the present disclosure.

As illustrated in FIG. 5, at least one embodiment of the present disclosure further provides a touch display device, which includes a display panel 51, a package substrate 52, a first adhesive 53 and a second adhesive 54. The display panel 51 includes a first substrate 514 and a second substrate 515 which are arranged to be opposite to each other; the package substrate 52 is disposed on a side, away from the second substrate 515, of the first substrate 514; the first adhesive 53 connects the package substrate 52 and the display panel 51 and covers a display area 511 of the display panel 51; the second adhesive 54 is disposed between the display panel 51 and the package substrate 52 and on a non-display area 512 of the display panel 52; and the hardness of the second adhesive 54 is greater than that of the first adhesive 53.

For instance, the display panel 51 may be an LCD panel, an organic light-emitting diode (OLED) display panel, a quantum dot light emitting display panel, etc.

For instance, a filler 519 may be disposed at a position, beyond the first substrate 514, of the second substrate 515; and the second adhesive 54 may be disposed on one side, close to the package substrate 52, of the filler 519.

The arrangement of the first adhesive 514, the second adhesive 515 and the filler 519 in the embodiment of the present disclosure may refer to relevant description in the touch LCD device. Detailed descriptions are omitted herein.

At least one embodiment of the present disclosure further provides a lamination method (for example, a full lamination method), which includes: forming a first adhesive on a display area of a display panel, with the first adhesive layer covering the display area; and forming a second adhesive on a non-display area of the display panel with hardness of the second adhesive greater than hardness of the first adhesive. In the method, the first adhesive connects the display panel and a package substrate, the second adhesive is disposed between the display panel and the package substrate, the display panel comprises a first substrate and a second substrate which are arranged to be opposite to each other, and the package substrate is disposed on a side, away from the second substrate, of the first substrate.

The arrangement of the structures in the embodiment of the present disclosure may refer to relevant description in the touch LCD device. Detailed description is omitted herein.

What are described above is related to the illustrative embodiments of the disclosure only and not limitative to the scope of the disclosure; the scopes of the disclosure are defined by the accompanying claims.

This application claims the benefit of Chinese Patent Application No. 201510391708.9, filed on Jul. 2, 2015, which is hereby entirely incorporated by reference as a part of the present application.

The invention claimed is:

1. A touch liquid crystal display (LCD) device, comprising an LCD module, a package substrate, a filler, a first adhesive and a second adhesive, wherein
   the LCD module and the package substrate are adhered to each other through the first adhesive which covers a display area of the LCD module;
   the second adhesive is disposed between the filler and the package substrate and on a non-display area of the LCD module, and hardness of the second adhesive is greater than hardness of the first adhesive;
   the LCD module comprises an opposite substrate close to the package substrate and an array substrate away from the package substrate;
   the filler is disposed at a position, beyond the opposite substrate, of the array substrate in the non-display area, the second adhesive is disposed on the filler; and
   in a direction perpendicular to a surface of the array substrate, the filler is disposed directly between the second adhesive and the array substrate, and a surface of the filler facing the package substrate is in direct contact with the second adhesive, and a surface of the filler away from a side where the package substrate is located is in direct contact with the array substrate.

2. The touch LCD device according to claim 1, wherein the second adhesive covers at least two opposite edge regions in the non-display area.

3. The touch LCD device according to claim 2, wherein the second adhesive covers two opposite edge regions in the non-display area.

4. The touch LCD device according to claim 2, wherein the filler is disposed in the at least two opposite edge regions in the non-display area.

5. The touch LCD device according to claim 1, wherein the filler comprises a photosensitive adhesive or plastic.

6. The touch LCD device according to claim 5, wherein the plastic comprises poly-terephthalic-acid series, polycarbonate or polythene.

7. The touch LCD device according to claim 1, wherein the first adhesive is glue or an optical adhesive, and the second adhesive is a plastic tape.

8. The touch LCD device according to claim 7, wherein a width of the plastic tape ranges from 0.2 mm to 0.4 mm.

9. The touch LCD device according to claim 7, wherein a thickness of the plastic tape ranges from 0.1 mm to 0.5 mm.

10. The touch LCD device according to claim 7, wherein the plastic tape is a double-sided plastic tape.

11. The touch LCD device according to claim 2, wherein the first adhesive is glue or an optical adhesive; and the second adhesive is a plastic tape.

12. The touch LCD device according to claim 3, wherein the first adhesive is glue or an optical adhesive; and the second adhesive is a plastic tape.

13. The touch LCD device according to claim 4, wherein the first adhesive is glue or an optical adhesive; and the second adhesive is a plastic tape.

14. The touch LCD device according to claim 5, wherein the first adhesive is glue or an optical adhesive; and the second adhesive is a plastic tape.

15. The touch LCD device according to claim 6, wherein the first adhesive is glue or an optical adhesive; and the second adhesive is a plastic tape.

16. The touch LCD device according to claim 1, wherein a thickness of the first adhesive is equal to a thickness of the second adhesive in a direction from the LCD module to the package substrate.

17. A touch display device, comprising:
   a display panel comprising a first substrate and a second substrate arranged to be opposite to each other;
   a package substrate disposed on a side, away from the second substrate, of the first substrate;
   a first adhesive connecting the package substrate and the display panel and covering a display area of the display panel;
   a second adhesive disposed between the display panel and the package substrate and on a non-display area of the display panel, wherein hardness of the second adhesive is greater than hardness of the first adhesive; and
   a filler is disposed at a position, beyond the first substrate, of the second substrate in the non-display area, the second adhesive is disposed on the filler in the non-display area,
   wherein the second adhesive is disposed between the filler and the package substrate, in a direction perpendicular to a surface of the array substrate, the filler is disposed directly between the second adhesive and the second substrate, and a surface of the filler facing the package substrate is in direct contact with the second adhesive, and a surface of the filler away from a side where the package substrate is located is in direct contact with the array substrate.

18. A lamination method, comprising:
   forming a first adhesive on a display area of a display panel, wherein the first adhesive layer covers the display area, wherein the display panel comprises a first substrate and a second substrate arranged to be opposite to each other, and a package substrate is disposed on a side, away from the second substrate, of the first substrate;
   forming a filler at a position, beyond the first substrate, of the second substrate in a non-display area; and
   forming a second adhesive on the filler in the non-display area of the display panel,
   wherein hardness of the second adhesive is greater than hardness of the first adhesive, the first adhesive connects the display panel and the package substrate, the second adhesive is disposed between the filler and the package substrate, in a direction perpendicular to a surface of the array substrate, the filler is disposed directly between the second adhesive and the second substrate, and a surface of the filler facing the package substrate is in direct contact with the second adhesive, and a surface of the filler away from a side where the package substrate is located is in direct contact with the array substrate.

19. The touch LCD device according to claim 1, wherein, the first adhesive is in direct contact with the LCD module and the package substrate, and the second adhesive is in direct contact with the package substrate.

* * * * *